(12) United States Patent
Rossler

(10) Patent No.: US 7,273,434 B1
(45) Date of Patent: Sep. 25, 2007

(54) AUTOMATIC TRANSMISSION BRAKE FOR RACING VEHICLES

(76) Inventor: Carl Rossler, 1 Rossler Dr., Girard, OH (US) 44420

( * ) Notice: Subject to any disclaimer, the term of this patent is extended or adjusted under 35 U.S.C. 154(b) by 164 days.

(21) Appl. No.: 11/204,205

(22) Filed: Aug. 16, 2005

(51) Int. Cl.
*F16H 61/22* (2006.01)

(52) U.S. Cl. .................... 475/116; 192/87.13

(58) Field of Classification Search .......... 475/116, 475/132, 134; 192/87.13, 87.18
See application file for complete search history.

(56) References Cited

U.S. PATENT DOCUMENTS 4,883,151 A  11/1989  Tobler
5,148,720 A   9/1992  Swenson, Sr. et al.
5,622,088 A   4/1997  Reid
6,050,384 A   4/2000  Hammond
7,066,075 B1* 6/2006  Callis, Jr. .................... 91/461

\* cited by examiner

*Primary Examiner*—Sherry Estremsky
*Assistant Examiner*—Edwin A. Young
(74) *Attorney, Agent, or Firm*—Harpman & Harpman

(57) ABSTRACT

An automatic transmission brake adapter for use in high performance vehicle drag racing. In electronic controlled automatic transmission, the transmission is held in both reverse and drive allowing the engine to accelerate without movement of a vehicle. Release of the reverse gear and associated rapid acceleration of the vehicle in drive is accomplished by a modular transmission brake adapter using the existing electronic automatic transmission control system without extensive modification thereto.

3 Claims, 4 Drawing Sheets

AUTOMATIC TRANSMISSION BRAKE FOR RACING VEHICLES

BACKGROUND OF THE INVENTION

1. Technical Field

This invention relates to transmission brakes for vehicles in which the transmission is held in place by engaging both drive and reverse gears simultaneously allowing the engine to be accelerated without moving the vehicle until the reverse gear is released. Such devices are used in high performance automobile drag racing in which it is important to get the fastest start possible when utilizing an automatic electronic controlled transmission.

2. Description of Prior Art

Prior art devices of this type have been directed to a variety of ways in which automatic transmissions can be selectively locked into a braking position for drag racing purposes when released, see for example U.S. Pat. Nos. 4,883,151, 5,148,720, 5,622,088 and 6,050,384.

In U.S. Pat. No. 4,883,151 a transmission brake is disclosed for automatic transmissions in which the conventional gear selector is modified in the vehicle with two gear engagement positions by modifying the existing manual selecting switch shift valve.

U.S. Pat. No. 5,148,720 discloses a lock-up solenoid assembly that is universal that closes off a fluid passageway allowing pressure to build up in a control chamber moving a valve element so that the front portion of the torque converter can empty itself, effectively locking the transmission.

An automatic transmission for racing is set forth in U.S. Pat. No. 5,622,088 which has a reverse gear piston that is engageable to act as a transmission brake.

U.S. Pat. No. 6,050,384 is directed to a method and device for rapid transmission brake release in which a modification to the automatic transmission is made applicable to Turbo Hydromatic 400 Transmissions. A pressure release passageway is provided in the servo cover so that it can be selectively blocked and unblocked by a solenoid.

SUMMARY OF THE INVENTION

An automatic transmission brake for use on electronically controlled automatic transmissions for high performance drag racing vehicles which allows for modification by use of a modular controller unit that is added to the existing electronic shift valve body. Electronically controlled transmissions can therefore be modified maintaining the use of the CEM computer controlled shift body while providing for an integrated transmission braking by engaging both drive and reverse gear simultaneously then instantaneously disengaging the reverse gear allowing for acceleration of the vehicle under high engine R.P.M.'s without effecting the electronic control of the transmission.

DETAILED DESCRIPTION OF THE INVENTION

Figure 1:
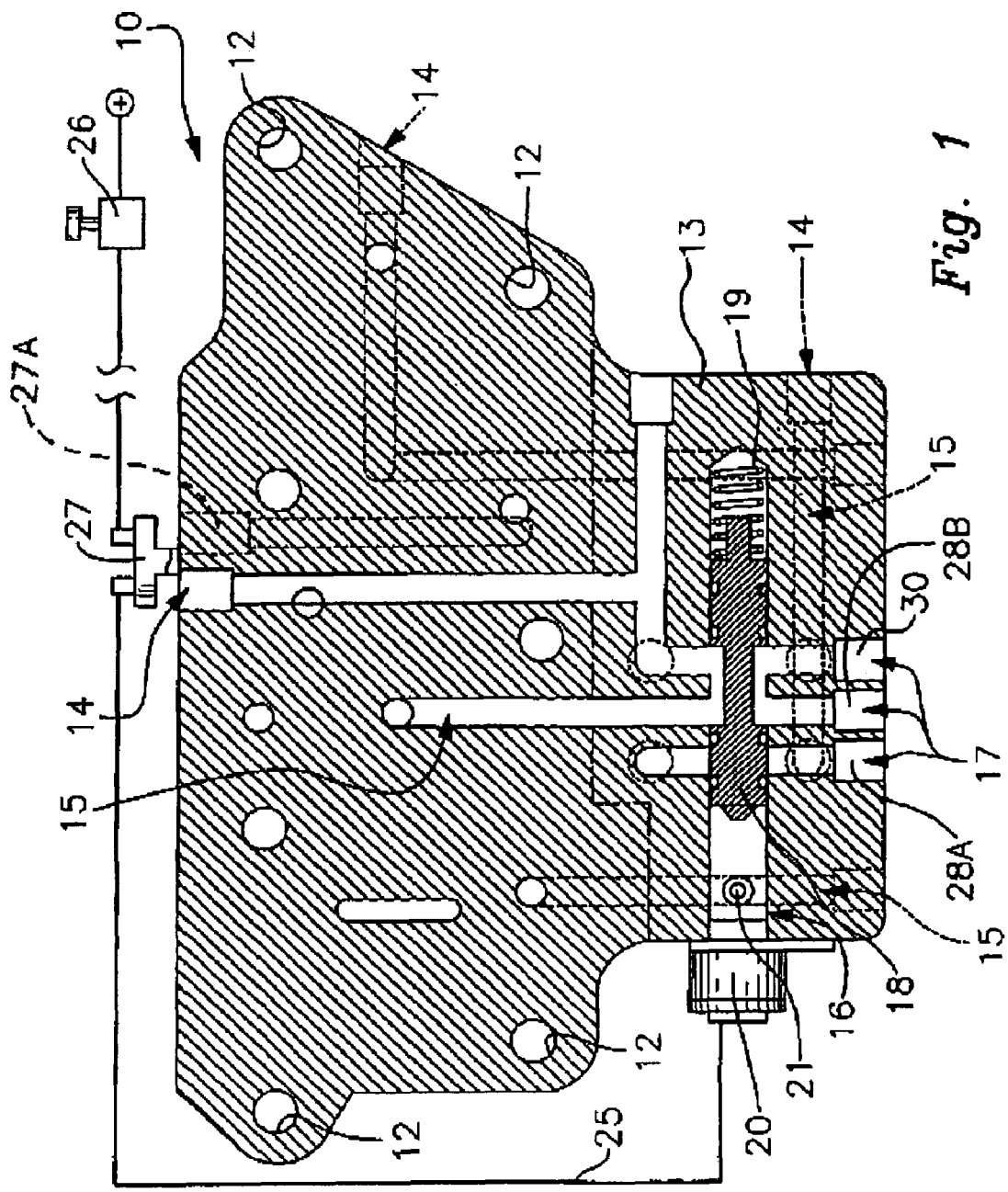
FIG. 1 is a sectional view on lines 1-1 of FIG. 2 showing the transmission brake control insert of the invention.
Figure 2:
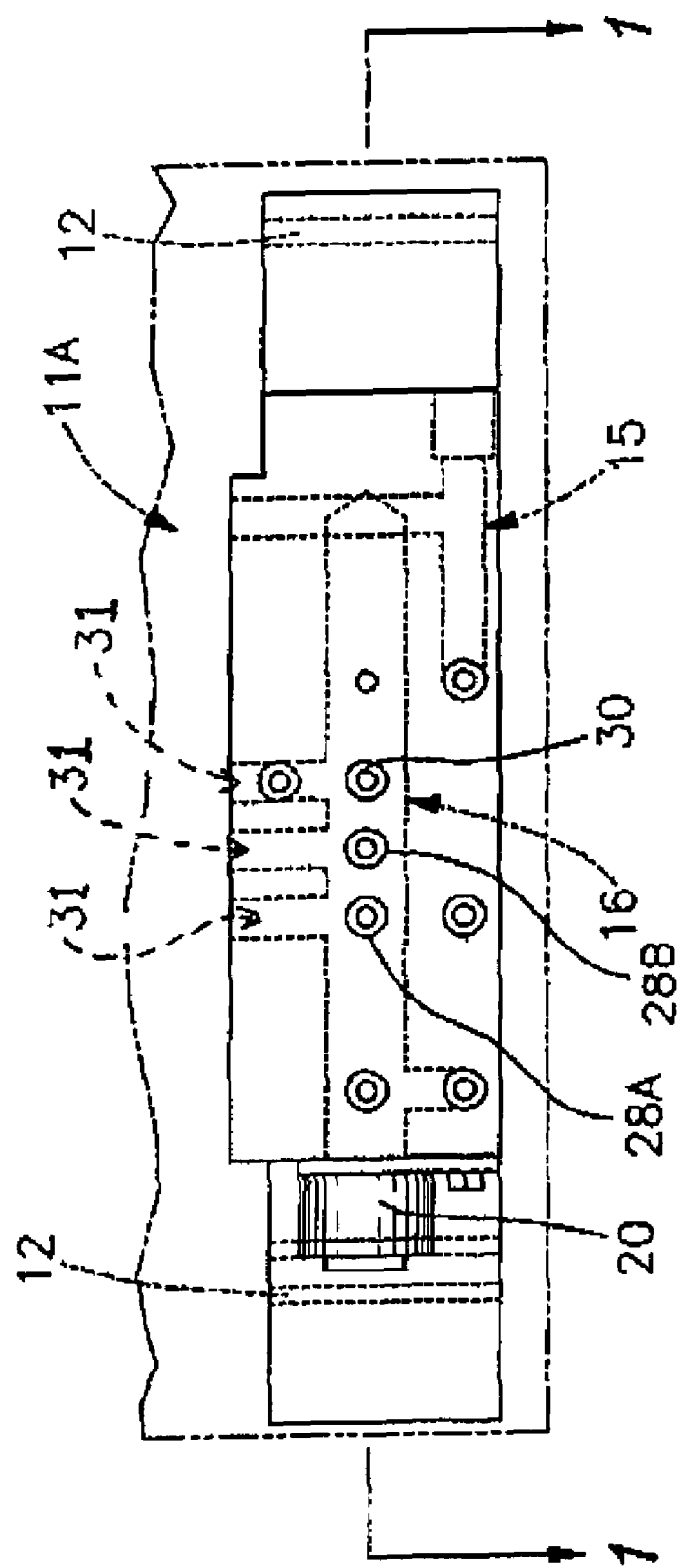
FIG. 2 is a front elevational view of the invention.

Referring now to FIGS. 1 and 2 of the drawings, a transmission brake 10 of the invention for use in electronically computer controlled automatic transmissions that use manifold type sensor fluid control switch as is well known and understood within the art. The transmission brake 10 of the invention is of a modified modular configuration that is installed within the transmission valve body 11 shown graphically in broken lines with the existing manifold sensor plate 11A shown graphically in broken lines reinstalled thereover via alignment of multiple bolt apertures 12 and inclusive mounting bolts (not shown).

A control body member 13 has a plurality of control fluid inlet and outlet portals generally referred to at 14 with interconnecting communication fluid pathways generally indicated at 15.

A cylinder control valve chamber 16 is formed within the main body member 13 and is in communication with control fluid pathway ports 17 for a drive and reverse gears activation thereof as will be explained in greater detail hereinafter.

A shuttle valve element 18 is movably disposed within the valve chamber 16 controlling the flow between the pathway ports 17 and is engaged by a spring 19 at one end thereof. A control solenoid 20 in oppositely disposed relation to the spring 19 is in communication with the valve chamber 16 via control portal 21 and valve needle 20A movably thereby for selectively sealing a portion of the chamber 16A defined by the effacing end 18A of the shuttle valve element 18. The shuttle valve element 18 has an oppositely disposed spring engagement seat 22 and a central area of reduced annular diameter at 23 and a plurality of annular ring gasket seals 24 on the valve body in spaced relation thereto as required to maintain a sealing relationship therewith.

Figure 3:
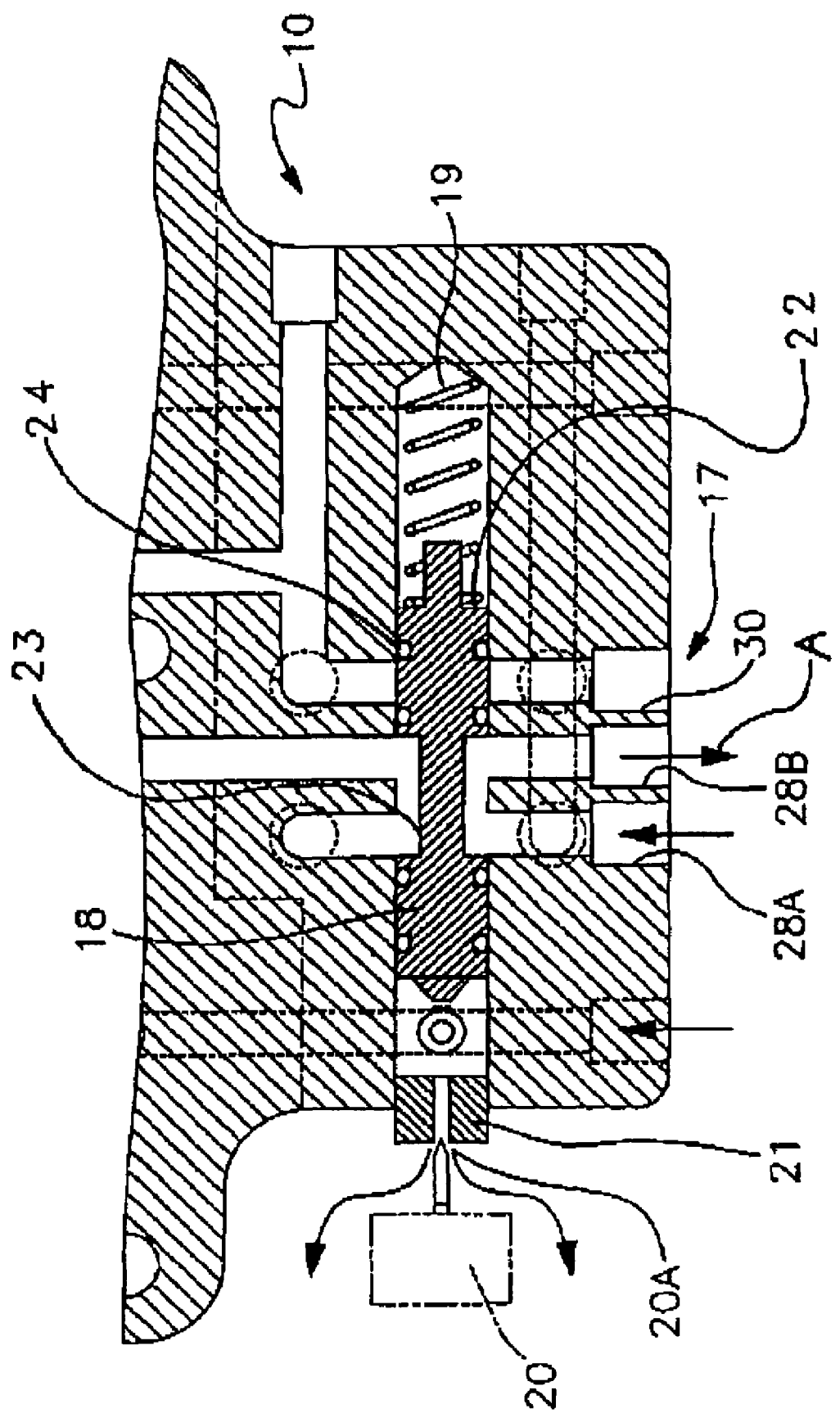
FIG. 3 is an enlarged partial sectional view of the control valve of the invention in unlocked position.

Referring to FIGS. 2 and 3 of the drawings, an enlarged valve control sectional view can be seen wherein the solenoid control port 21 and valve needle 20A is shown graphically for illustration purposes for the understanding of the control valving sequence of the system during use.

The solenoid valve 20 is in electrical communication via an electrical circuit 25 to a transmission brake activation button 26 as seen in FIG. 1 of the drawings. The transmission brake activation button 26 is interconnected in the electrical circuit 25 through an electronic pressure switch 27 that assures that the transmission brake of the invention cannot be engaged when the transmission is in overdrive for best performance as will be well understood by those skilled in the art. The pressure switch 27 is therefore in fluid communication with an overdrive fluid portal indicated at 27A as best seen in FIG. 1 of the drawings.

In operation, the electronically controlled automatic transmission will operate in a normal manner with the control solenoid 20 deactivated as seen in FIG. 3 of the drawings in which the fluid control pathway ports 17 specifically the "from" the reverse gear pathway 28A and the "to" reverse gear pathway 28B are in communication with each other as indicated by flow arrows A. The solenoid 20 prevents pressure build-up in the chamber portion 16A which is in non-restrictive communication with drive fluid via an inlet port 29.

Figure 4:
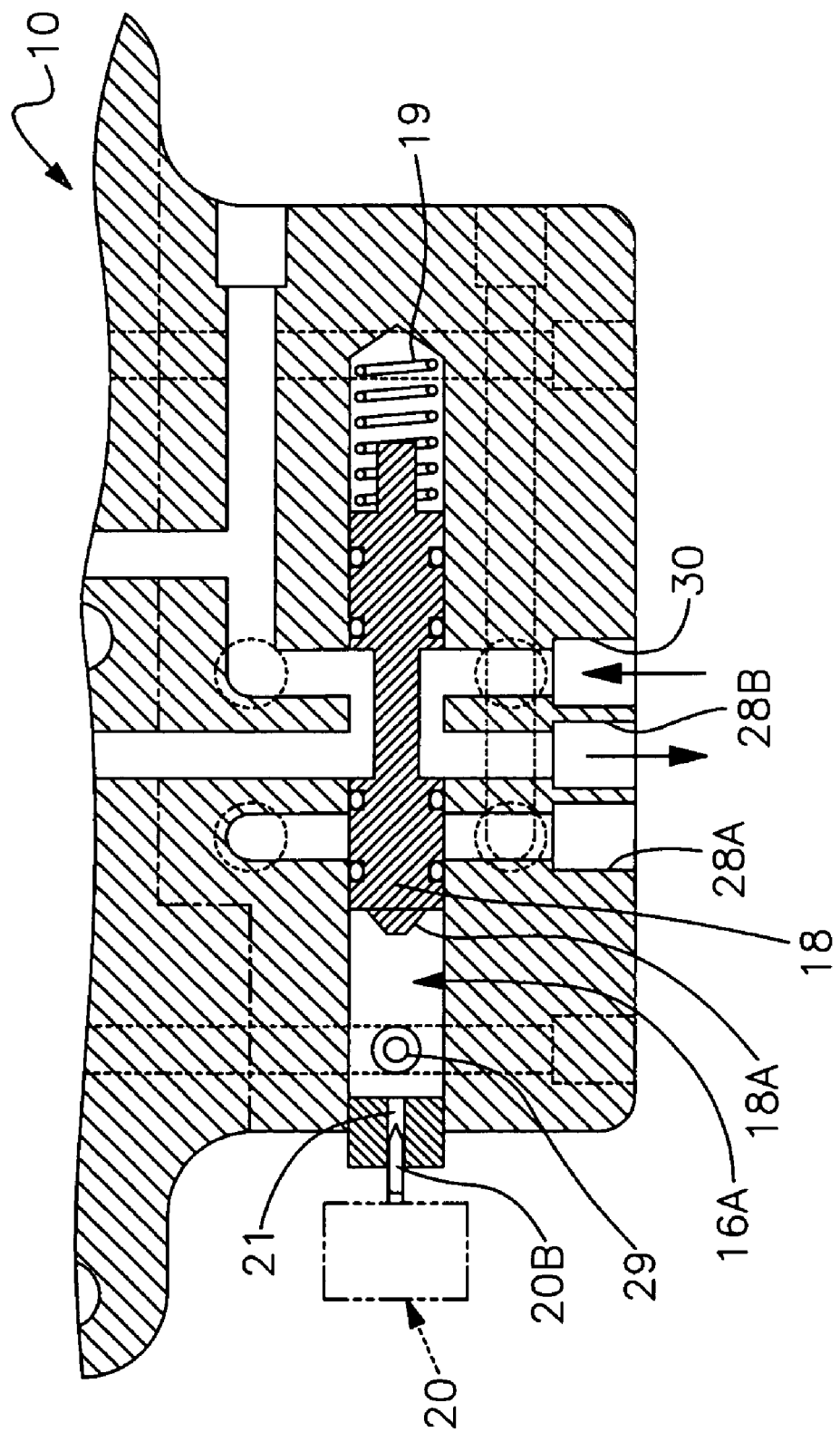
FIG. 4 is an enlarged partial sectional view of the control valve of the invention in locked drive position.

Once activated by the transmission brake activation button 26 the solenoid 20 seals the chamber portion 16A by engagement of the valve needle 20A within the solenoid control port 21 thereby pressurizing the chamber 16A driving the shuttle valve element 18 against the resilient spring 19 allowing control fluid to flow to both the drive gear by the drive port 30 and "to" reverse gear port 28B effectively locking the electronic control transmission in both reverse and drive gears as shown by flow arrows B as seen in FIG. 4 of the drawings.

Upon deactivation of the solenoid 20 the pressurized valve chamber portion 16A is vented again by opening the solenoid control port 21 and the spring urged shuttle valve element 18 returned to its first position, releasing reverse gear so that the vehicle (not shown) accelerates rapidly forward in "drive" at the established high R.P.M.'s as seen in FIG. 3 of the drawings.

It will be seen that the transmission brake 10 of the invention has a plurality of communication portals 31 shown in broken lines in FIG. 2 of the drawings that will interengage and communicate with existing corresponding fluid control passageways in the electronic transmission manifold 11A as seen in broken lines in FIG. 2 of the drawings which will allow for an effective and simple installation of the automatic transmission brake 10 of the invention without extensive modification to the existing transmission valve body. This assures full normal operation of the electronically controlled automatic transmission with the advantage of a true automatic transmission brake which is critical in the sport of drag racing as outlined above and understood by those skilled in the art.

It will thus be seen that a new and novel transmission brake for electronically controlled automatic transmissions for use in drag racing has been illustrated and described and it will be apparent to those skilled in the art that various changes and modifications may be made therein without departing from the spirit of the invention.

Therefore I claim:

1. A transmission brake for electronically controlled automatic transmissions having electronic controlled manifold in which the automatic transmission is locked by engagement in both drive and reverse gears simultaneously comprises, a control transmission module to be positioned within an existing transmission valve body, said control transmission module comprises, a control body, a shuttle valve element movably positioned within a valve chamber in said control body from a first non-activation position to a second activation position, a plurality of fluid inlet and outlet control portals defining "from" and "to" reverse and drive gear pathways in communication with said valve chamber, an activation solenoid having a needle valve in operable communication with said valve chamber, multiple fluid ports in said control body in registered communication with said electronic control manifold in selected ports therein, a remote momentary transmission brake activation switch for selective electric activation of said solenoid and an electrically connected pressure switch in communication with an over drive fluid control portal pathway with a source of electrical power remotely of said transmission brake.

2. The transmission brake for electronically controlled automatic transmission set forth in claim 1 wherein said first non-activation position provides communication between said "from" and "to" reverse fluid pathways.

3. The transmission brake for electronically controlled automatic transmission set forth in claim 1 wherein said second activation position of said shuttle valve comprises, communication between said "to" reverse and "drive" fluid pathways engaging both drive and reverse gears of said automatic transmission.

* * * * *